March 2, 1954
D. BIERMANN
2,670,901
FLUID MIXING VALVE
Filed Aug. 1, 1951
2 Sheets-Sheet 1
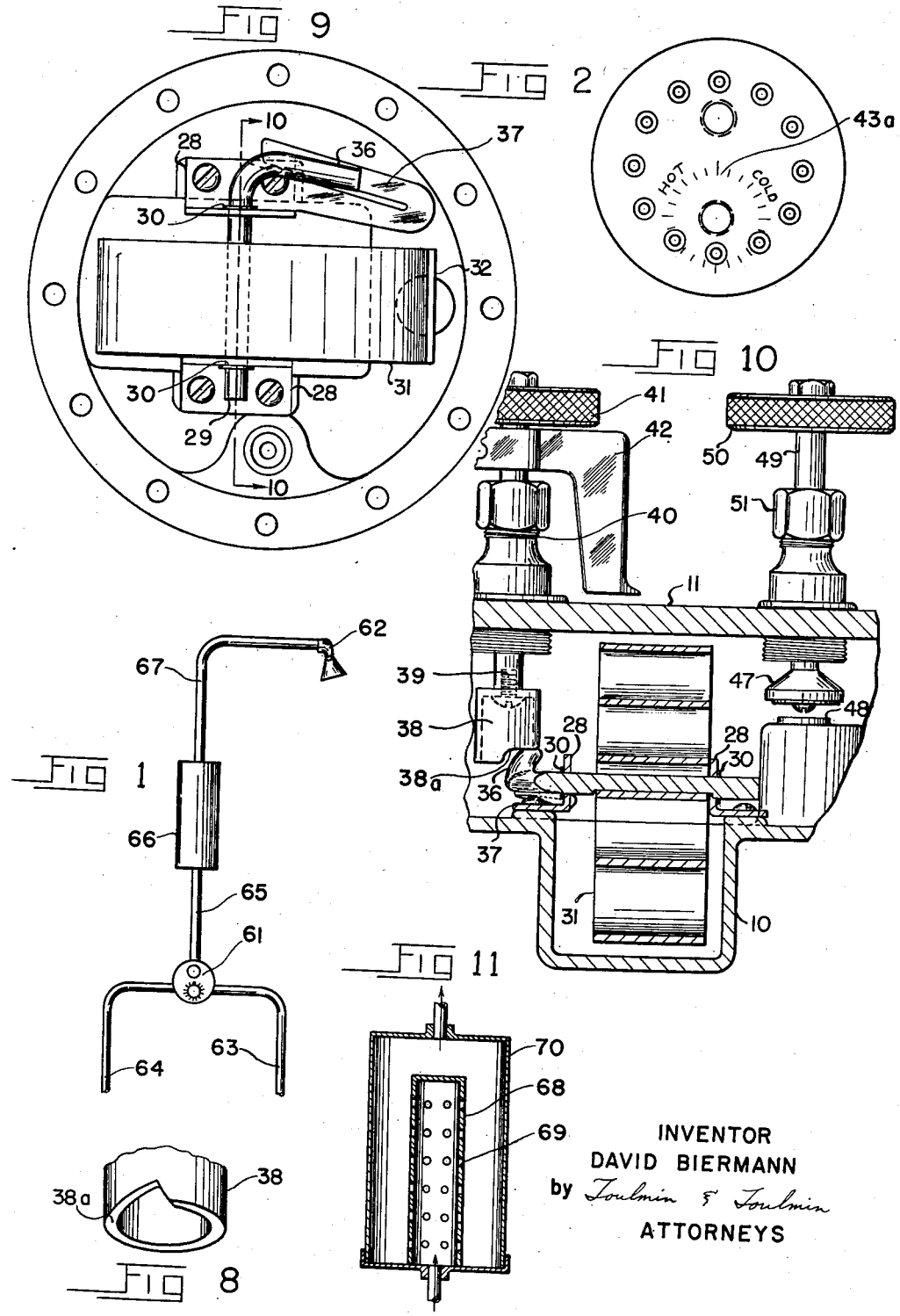
INVENTOR
DAVID BIERMANN
by Toulmin & Toulmin
ATTORNEYS

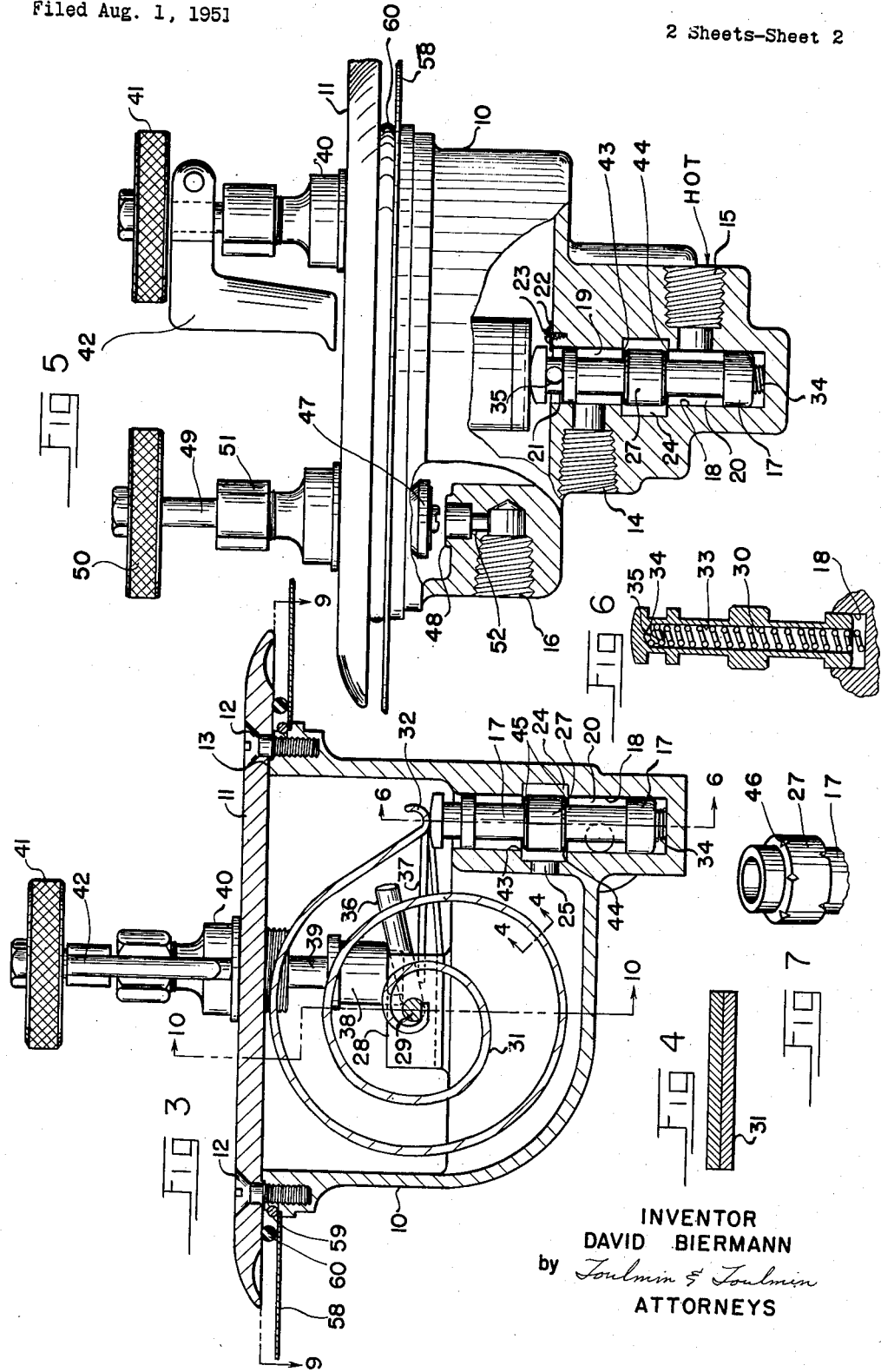

Patented Mar. 2, 1954

2,670,901

UNITED STATES PATENT OFFICE 2,670,901

FLUID MIXING VALVE

David Biermann, Piqua, Ohio, assignor of one-half to Hartzell Industries, Inc., Piqua, Ohio, a corporation of Ohio Application August 1, 1951, Serial No. 239,675

7 Claims. (Cl. 236—12)

This invention relates to a method and apparatus for controlling fluid temperatures, and particularly to such methods and apparatus in connection with mixing valves of the type that can be employed in showers and the like in order to regulate the temperature of the fluid being discharged. It will be apparent as this description proceeds that there are other uses to which a valve of this nature can be put, as, for example, in connection with certain industrial processes, particularly chemical, but for the sake of clarity the type of valve that has been illustrated and the particular description is for a regulating and mixing valve for a shower.

Mixing valves which are supplied with hot and cold water and which mix the streams of hot and cold water to form a single stream of water at a pre-determined temperature, and operate automatically to control this temperature, are known in the art and have been used, particularly in industrial processes, for some time.

These valves however have never been entirely satisfactory due to a number of different reasons. In the first place valves of this nature have heretofore been quite expensive and this has largely limited their use to industrial purposes.

Second, most valves of this type lack sufficient sensitivity to hold the temperature close enough to the desired value for use in connection with, for example, a shower, where a person could become severely burned on account of lack of sensitivity of the valve, or could at any rate experience extreme discomfort because of the shower water becoming too hot or too cold.

A third, and singular lack, in connection with mixing valves of the nature of which this invention is concerned is that they have been on one hand relatively insensitive to temperature changes while on the other hand being extremely sensitive to pressure changes. Because of this when such a mixing valve is installed in the plumbing system of a residence or apartment building, there is a tendency, when other taps are turned on or off in the building, for them to fluctuate badly in the temperature of the water discharged.

It has also been attempted to build mixing valves of this type wherein a single control arrangement was applied for regulating both temperature and volume. These valves have been exceedingly complicated and expensive and have required a great deal of maintenance and, partly due to their complex construction, have a tendency to accumulate deposits of lime and other foreign substances.

A still further fault encountered in connection with mixing valves of this nature is that whereas they were sometimes sensitive at one discharge rate and at one temperature, they became insensitive when the discharge volume was changed to any great degree or when the desired temperature output was adjusted toward one of the limits of the valve.

Accordingly, it is a primary object of this invention to devise an automatic regulating and mixing valve of the nature described of extremely high sensitivity and capable of holding the discharge temperature of the mixed fluid to a substantially constant value.

It is a further object to provide a regulating and mixing valve of the nature referred to which is substantially insensitive to temperature changes in the supplied fluid that is to be mixed.

A still further object is the provision of a regulating and mixing valve of high sensitivity which is substantially independent of normal pressure variations in the supply lines.

Another object of this invention is to provide a regulating and mixing valve of high sensitivity which will maintain its sensitivity through a wide range of volume flow.

A particular object of this invention is to provide a valve which is quite simple in construction thereby greatly reducing the service problems and also making the valve relatively inexpensive to manufacture and sell.

Another particular object of the present invention is to provide a temperature regulating and mixing valve which will control the temperature of the discharged fluid without materially affecting the volume of flow through the valve when the temperature sensitive regulating mechanism operates.

It is also an object of this invention to provide an arrangement in combination with a temperature regulating mechanism whereby fluctuations in temperature of the fluid discharge from the valve as brought about by extreme conditions or adjustment of the valve are smoothed out and minimized before the fluid reaches the point at which it is to be used.

Still another object of this invention is the provision of a valve of the nature referred to in which auxiliary valves for preventing interflow between the hot and cold supply pipes are eliminated.

These and other objects and advantages will become more apparent upon reference to the following specification taken in connection with the accompanying drawings wherein:

Figure 1 is a somewhat diagrammatic view showing an arrangement of the mixing valve of my invention in connection with a shower.

Figure 2 is a view looking in at the face of the valve with the handles thereof removed.

Figure 3 is a sectional view taken through the valve showing the temperature sensitive element therein and the valve member which it controls.

Figure 4 is a fragmentary cross section taken through the temperature sensitive element.

Figure 5 is a view generally in section and showing the arrangement of the hot and cold inlets for the valve and the controlling valve member therefor and the location of the discharge port of the valve.

Figure 6 is a sectional view indicated by line 6—6 on Figure 3 and showing the arrangement of the control spring in the regulating valve member.

Figure 7 is a perspective view showing a modified arrangement of the central spool of the control valve member.

Figure 8 is a perspective view showing the cam arrangement that is connected with the control knob by means of which the temperature of the fluid discharge from the valve can be regulated;

Figure 9 is a plan view looking into the valve with the cover plate removed.

Figure 10 is a sectional view indicated on line 10—10 of Figure 3 and showing the construction of the temperature sensitive element and the restoring spring therefor; and Figure 11 is a sectional view indicating one form of surge chamber or auxiliary mixing chamber that can be positioned on the downstream side of the regulating valve when desired.

Referring to the drawings somewhat more in detail, and particularly to Figures 2 through 10, the valve body is indicated at 10 and forms a cavity or main chamber which is closed at the front side by a cover plate 11 that may be held in place by screws 12. Gasket means as indicated at 13 may be provided for preventing leakage from the chamber within the valve body.

The hot and cold water supply pipes are threaded into the valve body at ports 14 and 15 respectively, while the mixed and regulated water is discharged from the valve through the threaded port 16.

According to this invention the ports 14 and 15 open into a valve bore 18 at spaced points therealong. Reciprocably mounted in bore 18 is valve member 17. Valve member 17 has three spaced undercuts thereon defining spaced spools. Between the main spool and the one directly thereabove there is formed a chamber 19 which communicates with cold water inlet 14. Similarly, a chamber 20 is formed beneath the main spool which communicates with hot water inlet 15.

The upper-most of the said reduced diameter portions forms a space 21 into which extends a member 22 fastened to the valve body by means of a screw 23. This arrangement provides for spaced stopped positions of the valve member 17.

The aforementioned main spool part of the valve member is indicated at 27 and is disposed within an enlarged chamber portion 24 in bore 18. The said spool 27 is somewhat shorter in length than the enlarged chamber portion 24 and this said chamber portion thereby normally communicates with both of the chambers 19 and 20 for receiving fluid therefrom.

A port 25 opens from the said enlarged chamber portion 24 of bore 18 into the main chamber of the valve body and which chamber communicates, as illustrated, with the discharge port 16.

Within the main chamber of the valve there are provided a pair of spaced L-shaped support brackets 28 which rotatably support a shaft 29 and which may advantageously be held in position in the said L-shaped brackets by means of the snap rings 30.

The shaft 29 between the brackets, has attached thereto the inner end of a spiral bi-metallic element 31 which has its free outer end bent back as at 32 to form a rounded configuration that bears on the upper end of valve member 17. It will be apparent that changes in temperature within the chamber of the main valve body will result in flexing of the bi-metallic element in one direction or the other thereby to actuate the valve member 17.

In order to give a thrust on the valve member in the upward direction, the said valve member is centrally bored as indicated 33 in Figure 6 and a long spring 34 extends into the said bore from the bottom of bore 18. This long spring gives a substantially constant thrust to the valve member throughout its range of travel and this contributes materially to the extreme sensitivity of the valve.

In order to prevent trapping of fluid in the lower end of bore 18 beneath the lower end of valve member 17, the said bore 33 is intercepted by the transverse passage 35 adjacent the upper end of valve member 17 so that the pressure in the lower end of bore 18 is always exactly equal to that within the main chamber of the valve body and no fluid can be trapped beneath the valve member. At the same time, this arrangement can be availed of to provide a certain damping effect for the valve member by adjusting the size of bore 35 in order somewhat to restrict the discharge of fluid therefrom should it become necessary to do so in order to prevent hunting or rapid fluctuations of the valve member.

Inasmuch as the chamber beneath enlarged portion 24 of bore 18 is supplied with hot water and the chamber above the said enlarged portion is supplied with cold water, the bi-metallic element 31 is arranged to move valve member 17 downwardly when the temperature in the main chamber of the valve increases and to flex in a direction to permit movement of valve member 17 upwardly by biasing spring 30 when the temperature in the main chamber of the valve decreases.

Shaft 29 has its one end turned out of the plane of the axis of the said shaft, as will be seen at 36 in Figures 3, 9, and 10. This bent part 36 of the shaft bears against a leaf spring 37 that thrusts upwardly on the part 36 and tends to urge the shaft in a counterclockwise direction as viewed in Figure 3. On the opposite side of the bent part 36 of shaft 29 there is a cam member 38 having its lower surface as at 38a formed to a helix of a suitable pitch to give the range of adjustment of the bi-metallic element desired. Cam 38 is mounted on the lower end of a stem 39 that extends out through the cover plate of the valve through a packing arrangement at 40 to have connected therewith an adjusting knob 41.

The stem 39 referred to may advantageously include an indicating pointer 42, best illustrated in Figure 5 and which is adapted to swing over the face of the cover plate of the valve to register with a scale 43a inscribed thereon and best seen in Figure 2.

Test and experiment has shown the advisability of providing gradual opening and closing of the gaps 43 and 44 formed between the chambers 19 and 24 and between the chambers 20 and 24, respectively. Unless the opening and closing of these openings is gradual, the temperature in the main chamber of the valve body has a tendency to change rapidly and this results in unstable action of the bi-metallic element due to its inability to react as quickly as the temperature is changing within the chamber. Erratic oscillation of the valve member 17 results and this condition can become so severe that control of the water temperature by the valve is lost completely.

In order to accomplish this gradual opening and closing of the gaps 43 and 44, the opposite ends of spool 27 may advantageously be tapered as indicated by reference numeral 45, this arrangement providing for the gradual restricting and establishing of the flow as described.

As seen in Figure 7 other means can be provided for affecting this attenuation and, as illustrated in Figure 7, such means may comprise V-shaped tapering grooves or slots 46 formed in the opposite ends of spool 27 of valve member 17.

Flow through the valve at the outlet 16 may advantageously be controlled by a valve member as at 47 of any suitable and well known type which cooperates with a seat 48. Valve member 47 is secured to the lower end of the valve stem 49 having a regulating knob 50 secured to the end thereof and the said stem extending through a packing arrangement 51 for preventing leakage from the valve.

Located within the passage between the seat 48 and the discharge opening of the valve is a restriction 52 which, while of a size that will permit full flow through the valve, is so arranged so that it will not permit the free exhausting of the main chamber of the valve so that at all times the said restriction or orifice has a certain throttling effect on the fluid flow. This tends to minimize changes in rates of fluid flow in the hot and cold supply pipes as brought about by changes in pressure therein and makes the operation of the regulating valve much more stable and uniform.

The valve according to this invention may advantageously be mounted in the wall of a shower cabinet or the like as is best illustrated in Figures 3 and 5. In these figures the wall of the shower cabinet is indicated at 58 and a snap ring at 59 serves to secure the valve body within an aperture in the said wall whereas an annular sealing ring 60 is positioned between the cover plate and the said shower wall. By this arrangement the valve body can be readily mounted in the position in the aperture in the wall of the shower cabinet and the cover plate thereafter mounted thereon and the entire unit presents a neat and finished appearance.

Returning now to Figure 1 there is illustrated therein the arrangement of the valve of this invention, generally indicated at 61, in combination with a shower head 62. The hot water supply line is indicated at 63 and the cold water supply line at 64. The discharge line from the regulating valve is indicated at 65 and this leads to the inlet of a surge tank 66 whose discharge side is connected by conduit 67 with the shower head 62. The surge tank operates to maintain a body of fluid of a substantial size between the regulating valve and the shower head so that changes in temperature at the discharge side of the valve are smoothed out and minimized before they reach the shower head.

In Figure 11 a somewhat modified arrangement of the surge tank is shown. In this figure the incoming fluid enters an inner shell 68 perforated about its periphery and length as at 69 so that the incoming fluid is discharged throughout the interior of the outer shell 70 and in this manner thoroughly admixes with the fluid in the outer shell so that the surge chamber has an additional regulating and mixing effect on the water when the temperature at the discharge of the regulating valve varies.

An important feature of the present valve resides in the fact that when the volume controlling valve is closed on its seat thereby halting flow through the valve, the body of fluid within the valve chamber gradually cools off and this causes the bi-metallic strip to deflect to the point that the spool 27 of the valve member 17 closes off one of the gaps between the enlarged chamber portion 24 and one of the chambers 19, 20 and in this manner isolates the cold water line from the hot water line and thereby prevents any interflow between the said lines. This arrangement conveniently eliminates the necessity for an additional cut-off valve to prevent this circulation.

It will be understood that this invention is susceptible to modification in order to adapt it to different usages and customs and is accordingly desired to comprehend such modifications as may be considered to come within the scope of the appended claims.

I claim:

1. In a fluid mixing valve; a valve body, a bore formed in said valve body and having an enlarged intermediate portion forming a mixing chamber, an inlet port opening into said bore on each side of said mixing chamber, a valve member reciprocably mounted in said bore moveable for inversely varying the communication of said mixing chamber with said ports, said valve being balanced under all conditions of flow through said valve, a second chamber in said valve body in continuous communication with said mixing chamber, a shaft mounted on said second chamber, a bi-metallic strip having one end secured to said shaft and its other end abuttingly engaging said valve member whereby changes in temperature in said second chamber will bring about flexing of said bi-metallic elements to move said valve member, spring means to move the valve member toward the bi-metallic strip, an outlet port in said valve body leading from said second chamber on the opposite side of said bi-metallic strip from the point of communication of said second chamber with said mixing chamber, and means externally of said valve for adjusting the angular position of said shaft therein, thereby to adjust the position of said bi-metallic element, said means comprising a manually operated means externally of said valve and a cam internally of the valve body engaging said shaft.

2. In a fluid mixing valve; a valve body, a bore formed in said valve body and having an enlarged intermediate portion forming a mixing chamber, an inlet port opening into said bore on each side of said mixing chamber, a valve member reciprocably mounted in said bore moveable for inversely varying the communication of said mixing chamber with said ports, a second chamber of said valve body in continuous communication with said mixing chamber, a shaft mounted on said second chamber, a bi-metallic strip having one end secured to said shaft and its other end formed to an arcuate configuration and bearing on said valve member but not connected thereto whereby changes in temperature in said second chamber will bring about flexing of said bi-metallic element to move said valve member, an elongated coil spring urging the valve member toward the end of the bi-metallic strip, an outlet port in said valve body leading from said second chamber, and means externally of said valve for adjusting the angular position of said shaft therein, thereby to adjust the position of said bi-metallic elements, said means comprising a manually operated means externally of said valve and a cam internally of the valve body engaging said shaft, and there being a spring for maintaining said shaft in engagement with the cam at all times.

3. In a fluid mixing valve; a valve body, a valve bore in said valve body having an enlarged intermediate portion forming a mixing chamber, an inlet port opening into said bore on each side of said mixing chamber, a valve member in said valve bore reciprocable for inversely varying the communication of said mixing chamber with said ports, a second and larger chamber in said valve body in continuous communication with said mixing chamber, said valve member being axially bored from one end, a spring in said axial bore acting on said valve member for continuously urging it in one direction in said valve bore, a temperature responsive element mounted in said second chamber having its end arcuately formed and engaging said valve member for moving it in a direction opposite to the urging of said spring, an exhaust port in said valve body opening from said second chamber positioned so the fluid passing through the valve flows over the bi-metallic strip, and means providing two spaced stopped positions of said valve member in the said bore, said stopped positions being such that in each thereof the said valve member substantially interrupts the communication between said mixing chamber and one of said inlet ports.

4. In a fluid mixing valve; a valve body, a bore in said valve body having an enlarged intermediate portion forming a mixing chamber, an inlet port opening into said bore on each side of said mixing chamber, a valve member in said bore reciprocable therein for inversely varying the communication of said mixing chamber with said inlet ports, a second and larger chamber in said valve body in continuous communication with said mixing chamber, said second chamber being substantially cylindrical and opening through one wall of the valve body, a coverplate detachably secured to said body and closing said opening, temperature responsive means in said second chamber responsive to variations in temperature therein for adjusting said valve member in the bore thereby to offset said temperature changes, an outlet port in said valve body opening from said second chamber, and means in said port for restricting the discharge of fluid from said second chamber, there being first manually adjustable means associated with said outlet port for varying the rate of discharge of fluid from said second chamber, and there also being second manually adjustable means externally of said valve body for adjusting said temperature responsive means, said first and second manually adjustable means being carried by said cover-plate so removal of the coverplate will expose the entire inside of said second chamber.

5. In a fluid mixing valve of the nature described; a valve body, a valve bore in said body, a pair of inlet ports opening into said bore, a valve member in said bore reciprocable for inversely varying the supply of fluid to said bore from said ports, a chamber of said valve body communicating with said bore to receive fluid therefrom, having an opening through one wall of the valve body, a coverplate closing said opening, a pair of spaced brackets in said chamber, a shaft extending between said brackets and pivotally supported thereon, a bi-metallic element having one end connected with said shaft and its other end bearing on said valve member, an offset end on said shaft, a spring acting on said offset end to rotate said shaft in one direction about its axis, a cam also bearing on said offset end for rotating said shaft in the other direction, and rotatable means connected with said cam operable externally of said valve for adjusting said cam, said rotatable means being carried by and extending through said coverplate.

6. In a fluid mixing device; a valve body, a pair of entrance ports formed in the valve body for admitting fluids of different temperatures, a mixing chamber comprising a bore in said valve body communicating with said ports inwardly of but adjacent its opposite ends and having an enlarged central portion, a second chamber in said body communicating with the said central portion of said mixing chamber, a valve member reciprocable in said mixing chamber for increasing the flow through one of said entrance ports while decreasing the flow through the other thereof and vice versa, said valve member having a spool portion fitting said bore at each end thereof and another spool portion of the same size as said bore disposed in said enlarged central portion of the bore whereby said valve member is balanced under all conditions of flow through the valve, and temperature sensitive means in said second chamber responsive to the temperature of the fluid therein for adjusting the position of said valve member in said bore.

7. In a fluid mixing valve; a valve body, two spaced entrance ports formed in said body for admitting fluids of different temperature, a mixing chamber in said valve body comprising a bore communicating inwardly of but adjacent its ends with said entrance ports and having an enlarged central portion, a valve member movable in said bore for inversely varying the flow from said ports to said mixing chamber, said valve member having a spool portion fitting said bore at each end thereof and another spool portion of the same size as said bore disposed in said enlarged central portion of the bore whereby said valve member is in an axially balanced condition under all conditions of flow through said valve, a second chamber in said valve body in continuous communication with the said central portion of said mixing chamber, an outlet port communicating with said second chamber for permitting the fluid to leave said valve, said outlet port being remote from the point of communication of said second chamber with said mixing chamber, and a temperature responsive element in said second chamber arranged for actuating said valve member to adjust the position of said valve member in said bore in response to changes of temperature in said second chamber.

DAVID BIERMANN.

References Cited in the file of this patent

UNITED STATES PATENTS

| Number | Name | Date |
|---|---|---|
| 1,939,970 | Fuess | Dec. 19, 1933 |
| 2,079,397 | Beauregard | May 4, 1937 |
| 2,102,011 | Kysor | Dec. 14, 1937 |
| 2,159,819 | Snediker | May 23, 1939 |
| 2,275,742 | Dillon | Mar. 10, 1942 |
| 2,287,810 | Lund | June 30, 1942 |
| 2,430,133 | Muffly | Nov. 4, 1947 |
| 2,448,170 | Brown | Aug. 31, 1948 |
| 2,463,640 | Plett | Mar. 8, 1949 |

FOREIGN PATENTS

| Number | Country | Date |
|---|---|---|
| 209,415 | Switzerland | July 1, 1940 |
| 253,317 | Great Britain | June 17, 1926 |
| 633,185 | France | Oct. 22, 1927 |